(12) United States Patent
Fujii et al.

(10) Patent No.: US 11,939,483 B2
(45) Date of Patent: Mar. 26, 2024

(54) INK SET, IMAGE RECORDING METHOD, METHOD OF PRODUCING LAMINATE, IMAGE RECORDED MATERIAL, AND LAMINATE

(71) Applicant: FUJIFILM CORPORATION, Tokyo (JP)

(72) Inventors: Yusuke Fujii, Kanagawa (JP); Ayato Sato, Kanagawa (JP); Takeshi Miyato, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 827 days.

(21) Appl. No.: 16/993,303

(22) Filed: Aug. 14, 2020

(65) Prior Publication Data

US 2020/0369904 A1    Nov. 26, 2020

Related U.S. Application Data

(63) Continuation of application No. PCT/JP2019/004854, filed on Feb. 12, 2019.

(30) Foreign Application Priority Data

Feb. 26, 2018    (JP) ................... 2018-031942

(51) Int. Cl.
*C09D 11/54* (2014.01)
*B41M 5/00* (2006.01)
(Continued)

(52) U.S. Cl.
CPC .......... *C09D 11/54* (2013.01); *B41M 5/0017* (2013.01); *C08K 3/16* (2013.01); *C08K 5/0091* (2013.01);
(Continued)

(58) Field of Classification Search
CPC ..... C09D 11/54; C09D 11/104; C09D 11/107; C09D 11/322; C09D 11/40; C09D 11/102;
(Continued)

(56) References Cited

U.S. PATENT DOCUMENTS

2009/0233068 A1*  9/2009  Irita ................. C09D 11/54
                                                    427/261
2010/0184914 A1   7/2010  Jono et al.
(Continued)

FOREIGN PATENT DOCUMENTS

JP    H4-085376 A      3/1992
JP    2002-302627 A   10/2002
(Continued)

OTHER PUBLICATIONS

English Machine Translation of JP2017013350A (Year: 2017).*
(Continued)

*Primary Examiner* — Jennifer A Smith
*Assistant Examiner* — Jeffrey Eugene Barzach
(74) *Attorney, Agent, or Firm* — SOLARIS Intellectual Property Group, PLLC

(57) ABSTRACT

Provided are an ink set which is used for recording an image on a surface having a surface energy of 40 mN/m or greater and included in an impermeable base material, the ink set including an ink containing water, a colorant, and resin particles, and a pretreatment liquid containing water and resin particles, in which the resin particles contained in the pretreatment liquid include at least one of a mixture of acrylic resin particles and polyester resin particles or composite particles including an acrylic resin and a polyester resin, and the resin particles contained in the ink include at least one of acrylic resin particles or polyurethane resin
(Continued)

particles; an image recording method; a method of producing a laminate; an image recorded material; and a laminate.

10 Claims, 1 Drawing Sheet

(51) Int. Cl.
| | |
|---|---|
| C08K 3/16 | (2006.01) |
| C08K 5/00 | (2006.01) |
| C08K 5/092 | (2006.01) |
| C08L 39/02 | (2006.01) |
| C08L 75/04 | (2006.01) |
| C09D 11/104 | (2014.01) |
| C09D 11/107 | (2014.01) |
| C09D 11/322 | (2014.01) |
| C09D 11/40 | (2014.01) |

(52) U.S. Cl.
CPC .............. *C08K 5/092* (2013.01); *C08L 39/02* (2013.01); *C08L 75/04* (2013.01); *C09D 11/104* (2013.01); *C09D 11/107* (2013.01); *C09D 11/322* (2013.01); *C09D 11/40* (2013.01); *C08K 2003/162* (2013.01); *C08L 2205/18* (2013.01)

(58) Field of Classification Search
CPC ... C09D 11/38; B41M 5/0017; B41M 5/0011; B41M 5/0047; B41M 5/0064; B41M 7/0027; C08K 3/16; C08K 5/0091; C08K 5/092; C08K 2003/162; C08L 39/02; C08L 75/04; C08L 2205/18; B32B 27/00; B32B 27/20; B32B 27/30
See application file for complete search history.

(56) References Cited

U.S. PATENT DOCUMENTS

| | | | |
|---|---|---|---|
| 2015/0174939 A1 | 6/2015 | Aoyama et al. | |
| 2015/0191031 A1 | 7/2015 | Ohta et al. | |
| 2017/0355868 A1* | 12/2017 | Saiga | C09D 11/40 |
| 2018/0257104 A1 | 9/2018 | Che et al. | |

FOREIGN PATENT DOCUMENTS

| | | | |
|---|---|---|---|
| JP | 2005-154674 A | | 6/2005 |
| JP | 2008-045072 A | | 2/2008 |
| JP | 2014-237742 A | | 12/2014 |
| JP | 2015-063064 A | | 4/2015 |
| JP | 2015-128826 A | | 7/2015 |
| JP | 2015-143003 A | | 8/2015 |
| JP | 2016-145312 A | | 8/2016 |
| JP | 2017-013350 A | | 1/2017 |
| JP | 2017013350 A | * | 1/2017 |
| JP | 6079453 B2 | | 2/2017 |
| JP | 2017-088646 A | | 5/2017 |
| JP | 2017-114934 A | | 6/2017 |
| JP | 2017-114970 A | | 6/2017 |
| WO | 2017/098920 A1 | | 6/2017 |

OTHER PUBLICATIONS

English language translation of the following: Decision of Refusal dated Mar. 22, 2022 from the JPO in a Japanese patent application No. 2020-501686 corresponding to the instant patent application. This office action translation is submitted now in order to supplement the understanding of the cited references which are being disclosed in the instant Information Disclosure Statement.
Office Action dated Feb. 1, 2023, issued by the EPO in corresponding EP Patent Application No. 19757712.5.
International Search Report issued in International Application No. PCT/JP2019/004854 dated Apr. 23, 2019.
Written Opinion of the ISA issued in International Application No. PCT/JP2019/004854 dated Apr. 23, 2019.
English language translation of the following: Office action dated Dec. 17, 2021 from the SIPO in a Chinese patent application No. 201980013711.3 corresponding to the instant patent application.
English language translation of the following: Office action dated Jun. 15, 2021 from the JPO in a Japanese patent application No. 2020-501686 corresponding to the instant patent application. This office action translation is submitted now in order to supplement the understanding of the cited reference which is being disclosed in the instant Information Disclosure Statement.
Extended European Search Report dated Mar. 30, 2021, issued in corresponding EP Patent Application No. 19757712.5.

* cited by examiner

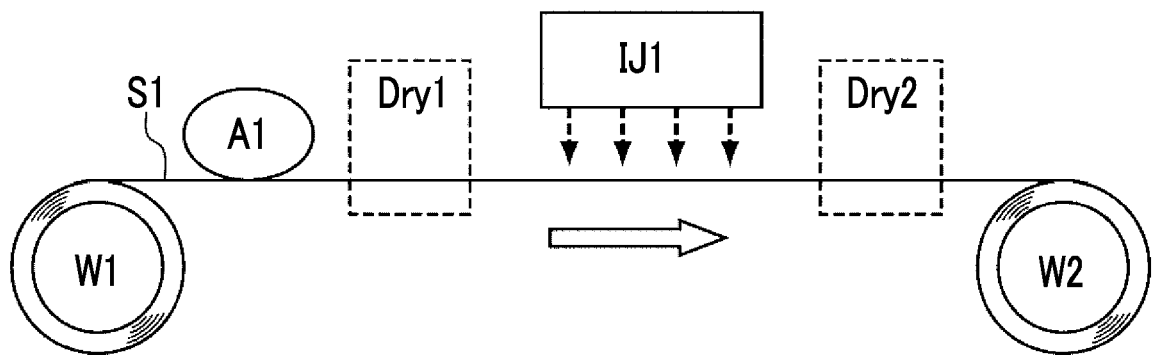

INK SET, IMAGE RECORDING METHOD, METHOD OF PRODUCING LAMINATE, IMAGE RECORDED MATERIAL, AND LAMINATE

CROSS-REFERENCE TO RELATED APPLICATIONS

This application is a continuation application of International Application No. PCT/JP2019/004854, filed Feb. 12, 2019, the disclosure of which is incorporated herein by reference in its entirety. Further, this application claims priority from Japanese Patent Application No. 2018-031942, filed Feb. 26, 2018, the disclosure of which is incorporated herein by reference in its entirety.

BACKGROUND OF THE INVENTION

1. Field of the Invention

The present disclosure relates to an ink set, an image recording method, a method of producing a laminate, an image recorded material, and a laminate.

2. Description of the Related Art

In the related art, various examinations have been conducted on inks used for recording images, liquids other than the inks used for recording images, ink sets comprising the inks and the liquids other than the inks, and the like.

For example, JP2017-013350A discloses, as a recording method that enables provision of a recorded material with a high glossiness, a recording method including: a first drying step of coating a recording medium with a pretreatment liquid and drying the pretreatment liquid at a drying temperature T1; a second drying step of attaching an ink composition to the recording medium coated with the pretreatment liquid and drying the ink composition at a drying temperature T2; and a third drying step of coating the recording medium, to which the ink composition has been attached, with a post-treatment liquid and drying the post-treatment liquid at a drying temperature T2, in which the pretreatment liquid contains a resin having a glass transition temperature Tg1, the ink composition contains a resin having a glass transition temperature Tg2, and the post-treatment liquid contains a resin having a glass transition temperature Tg3, and Expressions (1) and (2) are satisfied.

$$Tg1 < Tg2 < Tg3 \quad (1)$$

$$T1 < T2 < T3 \quad (2)$$

Further, JP2017-114970A discloses a coating solution which contains polymer particles, polyethylene glycol having a number average molecular weight of 1000 to 300000, and water, as a coating solution having excellent dispersibility of polymer particles.

JP2017-114970A also discloses a method of producing a recording medium, including a coating solution application step of applying a coating solution which is the coating solution described above and further contains a coloring material aggregating agent onto an impermeable base material; and a drying step of drying the coating solution applied onto the impermeable base material, in which a coating layer containing a polymer, polyethylene glycol with a number average molecular weight of 1000 to 300000, and a coloring material aggregating agent is provided on the impermeable base material.

JP2017-114970A also discloses a recording medium in which white turbidness of the coating layer is suppressed can be produced as compared with a case where the coating solution contains only polymer particles, a coloring material aggregating agent, and water, according to the above-described method of producing a recording medium.

Further, JP2016-145312A discloses, as an ink set in which the density of a solid image area is decreased and an image with suppressed streak-like unevenness (streak unevenness) and suppressed roughness is formed, an ink set including: an ink composition which includes resin particles, a colorant, and water; and a treatment liquid which includes a compound aggregating at least one of the resin particles or the colorant in the ink composition, an anionic surfactant, and water and in which a ratio of the content of the anionic surfactant to the content of the compound aggregating at least one of the resin particles or the colorant is in a range of 0.001 to 0.600 on a mass basis.

Further, JP2017-114934A discloses, as a pretreatment liquid that enables achievement of a high image quality and high adhesion durability with suppressed bleeding even in a case of performing printing on a low-absorbing medium or particularly a non-absorbing medium such as a film at a high speed for a long time, a treatment liquid for an ink jet recording ink containing at least: a cationic or nonionic resin which has a polyurethane structure; an organic acid; and water, in which the organic acid has a first dissociation constant of 3.5 or less, and the pH of the treatment liquid is less than the first dissociation constant of the organic acid.

JP2017-114934A also discloses a recording liquid set including an ink jet recording ink which contains at least a pigment, an organic solvent, and water; and the treatment liquid described above.

SUMMARY OF THE INVENTION

In examples of JP2017-013350A, a pretreatment liquid containing an acrylic resin is used. However, in some cases, the technique described in JP2017-013350A is required to further improve the adhesiveness between the image and the base material on which the image is recorded (hereinafter, also referred to as the "adhesiveness of the image").

In examples of JP2017-114970A, a coating solution containing urethane-acrylate copolymer particles or polyurethane particles and polyethylene glycol is used. However, in some cases, the technique described in JP2017-114970A is required to further improve the rub resistance of the image and/or the adhesiveness of the image.

In examples of JP2016-145312A, a treatment liquid containing silicone resin particles and silica particles is used. However, in some cases, the technique described in JP2016-145312A is required to further improve the rub resistance of the image and/or the adhesiveness of the image.

In examples of JP2017-114934A, a treatment liquid containing a resin which has a polyurethane structure is used. However, in some cases, the technique described in JP2017-114934A is required to further improve the rub resistance of the image.

An object of a first aspect of the present disclosure is to provide an ink set that is capable of recording an image with excellent rub resistance and adhesiveness.

An object of a second aspect of the present disclosure is to provide an image recording method that enables recording of an image with excellent rub resistance and adhesiveness.

An object of a third aspect of the present disclosure is to provide a method of producing a laminate, which enables production of a laminate comprising an image recorded material which comprises an impermeable base material and an image; and a base material for lamination which is laminated on a side where the image of the image recorded material is recorded, in which the lamination strength between the image recorded material and the base material for lamination is excellent.

An object of a fourth aspect of the present disclosure is to provide an image recorded material comprising an image with excellent rub resistance and adhesiveness.

An object of a fifth aspect of the present disclosure is to provide a laminate comprising an image recorded material which comprises an impermeable base material and an image; and a base material for lamination which is laminated on a side where the image of the image recorded material is recorded, in which the lamination strength between the image recorded material and the base material for lamination is excellent.

Specific means for achieving the above-described objects includes the following aspects.

<1> An ink set which is used for recording an image on a surface having a surface energy of 40 mN/m or greater and included in an impermeable base material, the ink set comprising: an ink containing water, a colorant, and resin particles; and a pretreatment liquid containing water and resin particles, in which the resin particles contained in the pretreatment liquid include at least one of a mixture of acrylic resin particles and polyester resin particles or composite particles including an acrylic resin and a polyester resin, and the resin particles contained in the ink include at least one of acrylic resin particles or polyurethane resin particles.

<2> The ink set according to <1>, in which the resin particles contained in the ink include acrylic resin particles.

<3> The ink set according to <1> or <2>, in which the pretreatment liquid further contains at least one aggregating agent selected from the group consisting of a polyvalent metal compound, an organic acid, a metal complex, and a water-soluble cationic polymer.

<4> The ink set according to any one of <1> to <3>, in which a mass ratio of the polyester resin to the acrylic resin in the resin particles contained in the pretreatment liquid is in a range of 0.1 to 10.

<5> The ink set according to any one of <1> to <4>, in which in a case where a glass transition temperature of the resin particles contained in the pretreatment liquid is set as $T_{gp}$ and a glass transition temperature of the resin particles contained in the ink is set as $T_{gi}$, a relationship of $T_{gp} < T_{gi}$ is satisfied.

<6> The ink set according to <5>, in which relationships of 0° C. ≤ $T_{gp}$, $T_{gi}$ ≤ 150° C., and 30° C. ≤ $T_{gi} - T_{gp}$ are satisfied.

<7> The ink set according to any one of <1> to <6>, in which in a case where a volume average particle diameter of the resin particles contained in the pretreatment liquid is set as $P_p$ and a volume average particle diameter of the resin particles contained in the ink is set as $P_i$, a relationship of $P_i < P_p$ is satisfied.

<8> The ink set according to any one of <1> to <7>, in which the resin particles contained in the pretreatment liquid include the composite particles.

<9> The ink set according to any one of <1> to <8>, in which the ink set is used for recording of an image in a laminate comprising an image recorded material which includes the impermeable base material and the image recorded on the surface of the impermeable base material, and a base material for lamination which is laminated on a side where the image of the image recorded material is recorded.

<10> An image recording method using the ink set according to any one of <1> to <9>, the method comprising: a step of applying the pretreatment liquid onto the surface of the impermeable base material; and a step of applying the ink to at least a part of a region where the pretreatment liquid has been applied onto the surface of the impermeable base material.

<11> A method of producing a laminate, comprising: a step of obtaining an image recorded material which includes the impermeable base material and the image recorded on the surface of the impermeable base material by the image recording method according to <10>; and a step of laminating a base material for lamination on a side where the image of the image recorded material is recorded to obtain a laminate.

<12> An image recorded material comprising: an impermeable base material which has a surface having a surface energy of 40 mN/m or greater; and an image recorded on the surface of the impermeable base material, in which the image includes a layer A containing at least one of an acrylic resin or a polyurethane resin and a colorant and a layer B containing an acrylic resin and a polyester resin and disposed between the layer A and the impermeable base material.

<13> A laminate comprising: the image recorded material according to <12>; and a base material for lamination which is laminated on a side where the image of the image recorded material is recorded.

According to the first aspect of the present disclosure, it is possible to provide an ink set that is capable of recording an image with excellent rub resistance and adhesiveness.

According to the second aspect of the present disclosure, it is possible to provide an image recording method that enables recording of an image with excellent rub resistance and adhesiveness.

According to the third aspect of the present disclosure, it is possible to provide a method of producing a laminate, which enables production of a laminate comprising an image recorded material which comprises an impermeable base material and an image; and a base material for lamination which is laminated on a side where the image of the image recorded material is recorded, in which the lamination strength between the image recorded material and the base material for lamination is excellent.

According to the fourth aspect of the present disclosure, it is possible to provide an image recorded material comprising an image with excellent rub resistance and adhesiveness.

According to the fifth aspect of the present disclosure, it is possible to provide a laminate comprising an image recorded material which comprises an impermeable base material and an image; and a base material for lamination which is laminated on a side where the image of the image recorded material is recorded, in which the lamination strength between the image recorded material and the base material for lamination is excellent.

BRIEF DESCRIPTION OF THE DRAWINGS

FIG. 1 is a schematic configuration view illustrating an example of an image recording device suitable for performing an image recording method according to an example of the present disclosure.

DESCRIPTION OF THE PREFERRED EMBODIMENTS

In the present disclosure, the numerical ranges shown using "to" indicate ranges including the numerical values described before and after "to" as the lower limits and the upper limits.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present specification, an upper limit or a lower limit described in a certain numerical range may be replaced with an upper limit or a lower limit in another numerical range described in a stepwise manner or may be replaced with a value described in an example.

In the present disclosure, the meaning of the term "step" includes not only an independent step but also a step whose intended purpose is achieved even in a case where the step is not clearly distinguished from other steps.

In the present disclosure, a combination of two or more preferable aspects is a more preferable aspect.

[Ink Set]

An ink set according to the embodiment of the present disclosure is an ink set which is used for recording an image on a surface having a surface energy of 40 mN/m or greater and included in an impermeable base material, the ink set comprising an ink containing water, a colorant, and resin particles; and a pretreatment liquid containing water and resin particles, in which the resin particles contained in the pretreatment liquid include at least one of a mixture of acrylic resin particles and polyester resin particles or composite particles including an acrylic resin and a polyester resin, and the resin particles contained in the ink include at least one of acrylic resin particles or polyurethane resin particles.

In the ink set according to the embodiment of the present disclosure, an image with excellent rub resistance and adhesiveness can be recorded.

The reason why such effects are exhibited are assumed as follows. However, the ink set according to the embodiment of the present disclosure is not limited to the following reasons.

The ink set according to the embodiment of the present disclosure is used for recording an image on a surface having a surface energy of 40 mN/m or greater and included in an impermeable base material.

The image can be recorded by applying the pretreatment liquid used for the ink set according to the embodiment of the present disclosure onto the surface of the impermeable base material and applying the ink used for the ink set according to the embodiment of the present disclosure to a region where the pretreatment liquid of the impermeable base material has been applied.

The image recorded in the above-described manner is considered to have a pretreatment liquid-derived layer (hereinafter, also referred to as a "pretreatment liquid-derived layer") and an ink-derived layer (hereinafter, also referred to as an "ink-derived layer") in this order as viewed from the surface of the impermeable base material.

In the present disclosure, the interface between the pretreatment liquid-derived layer and the ink-derived layer does not necessarily need to be clear. For example, in the image of the present disclosure, a region where the components of the pretreatment liquid are mixed with the components of the ink is present between the pretreatment liquid-derived layer and the ink-derived layer, and the composition in the thickness direction of the image may continuously change.

The reason why the effect of improving the adhesiveness of the image is obtained is assumed as follows.

The pretreatment liquid contains, as resin particles, at least one of the above-described mixture (that is, a mixture of acrylic resin particles and polyester resin particles) or the above-described composite particles (that is, composite particles containing an acrylic resin and a polyester resin). Therefore, the pretreatment liquid-derived layer contains both an acrylic resin and a polyester resin as components derived from the resin particles in the pretreatment liquid.

Meanwhile, the ink contains at least one of acrylic resin particles or polyurethane resin particles as resin particles. Therefore, the ink-derived layer contains at least one of an acrylic resin or a polyurethane resin as components derived from the resin particles in the ink.

It is considered that since the polyester resin in the pretreatment liquid-derived layer is a resin having an ester bond which is a polar group in the main chain, the polyester resin has an excellent interaction with the surface of the impermeable base material with a surface energy of 40 mN/m or greater. Therefore, the polyester resin in the pretreatment liquid-derived layer is considered to contribute to improving the adhesiveness between the pretreatment liquid-derived layer and the impermeable base material.

Meanwhile, it is considered that since the acrylic resin in the pretreatment liquid-derived layer has a chemical structure that is the same as or similar to the chemical structure of the acrylic resin and/or the polyurethane resin in the ink-derived layer, the acrylic resin in the pretreatment liquid-derived layer has an excellent interaction with the acrylic resin and/or the polyurethane resin. Therefore, the acrylic resin in the pretreatment liquid-derived layer is considered to contribute to improving the adhesiveness between the pretreatment liquid-derived layer and the ink-derived layer.

As described above, it is considered that the adhesiveness between the impermeable base material and the pretreatment liquid-derived layer is enhanced, the adhesiveness between the pretreatment liquid-derived layer and the ink-derived layer is also enhanced, and thus the adhesiveness between the impermeable base material and the image including the pretreatment liquid-derived layer and the ink-derived layer is enhanced.

The reason why the effect of improving the rub resistance of the image is obtained is considered that the acrylic resin and/or the polyurethane resin in the ink-derived layer is a resin with excellent strength as compared with, for example, a polyester resin, and as a result, the strength of the ink-derived layer having the surface of the image is increased.

Hereinafter, first, the impermeable base material which is used for recording of an image obtained by using the ink set according to the embodiment of the present disclosure and has surface with a surface energy of 40 mN/m or greater will be described.

<Impermeable Base Material Having Surface with Surface Energy of 40 mN/m or Greater>

The impermeable base material of the present disclosure has a surface with a surface energy of 40 mN/m or greater. The ink set according to the embodiment of the present disclosure is used for recording an image on the surface thereof.

The impermeable base material of the present disclosure may be formed such that a part of the entire surface satisfies the condition of a surface energy of 40 mN/m or greater, and the impermeable base material may have portions with a surface energy of less than 40 mN/m as long as this condition is satisfied.

In the present disclosure, the surface energy of the surface of the impermeable base material is acquired by the Owens-Wendt method.

Specifically, the contact angle between pure water and the surface of a sample cut out from the impermeable base material, the contact angle between diiodomethane and the surface thereof, and the contact angle between ethylene glycol and the surface thereof are respectively measured. These contact angles are measured using, for example, a solid-liquid interface analyzer "Drop Master 500" (manufactured by Kyowa Interface Science, Inc.). A dispersion component γS of the surface energy, a polar component γP of the surface energy, and a hydrogen bond component γH of the surface energy are derived based on these contact angles. The total of the dispersion component γS, the polar component γP, and the hydrogen bond component γH is set as the surface energy (mN/m) of the surface described above.

The details of the Owens-Wendt method can refer to D. K. Owens and R. C. Wendt, J. Appl. Polym. Sci., 13, 1741 (1969).

The upper limit of the surface energy of the surface with a surface energy of 40 mN/m or greater is not particularly limited, the upper limit is, for example, 100 mN/m, preferably 80 mN/m, and more preferably 60 mN/m.

In the present disclosure, the "impermeable base material" indicates a base material that absorbs less water or does not absorb water. Specifically, the "impermeable base material" indicates a base material having a water absorption amount of 0.3 g/m$^2$ or less.

The water absorption amount (g/m$^2$) of the base material is measured as follows.

Water is brought into contact with a region having a size of 100 mm×100 mm in the front surface of the base material (that is, the surface to which the pretreatment liquid is applied), and the state is maintained at 25° C. for 1 minute. The mass (absorption amount (g)) of water absorbed by maintaining the state for 1 minute is acquired, and the obtained absorption amount (g) is converted to the absorption amount per unit area (g/m$^2$).

The impermeable base material is not particularly limited, but a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

The shape of the resin base material is not particularly limited, but a sheet-like resin base material is preferable. From the viewpoint of the productivity of the recording medium, a sheet-like resin base material which is capable of forming a roll by being wound is more preferable.

The thickness of the resin base material is preferably in a range of 10 μm to 200 μm and more preferably in a range of 10 μm to 100 μm.

From the viewpoint of improving the surface energy, the resin base material may be subjected to a surface treatment. Examples of the surface treatment include a corona treatment, a plasma treatment, a flame treatment, a heat treatment, an abrasion treatment, and a light irradiation treatment (UV treatment), but the present invention is not limited thereto.

An impermeable base material in which the surface energy of at least a part of the surface is adjusted to 40 mN/m or greater by performing the surface treatment is also included in the range of the "impermeable base material having a surface with a surface energy of 40 mN/m or greater" in the present disclosure.

The corona treatment can be performed using Corona Master (manufactured by Shinko Electric & Instrumentation Co., Ltd., PS-10S) or the like.

The conditions for the corona treatment may be appropriately selected depending on the situation, for example, the kind of the resin base material, the composition of the ink, and the like. For example, the following treatment conditions may be employed.

Treatment voltage: 10 kV to 15.6 kV
Treatment speed: 30 to 100 mm/s

Next, the pretreatment liquid and the ink which are comprised in the ink set according to the embodiment of the present disclosure will be described.

As described above, the ink set according to the embodiment of the present disclosure comprises the ink and the pretreatment liquid.

The ink set according to the embodiment of the present disclosure may comprise only one or two or more kinds of inks.

The ink set according to the embodiment of the present disclosure may comprise only one or two or more kinds of pretreatment liquids.

As a preferred embodiment of the ink set according to the present disclosure, an embodiment of the ink set comprising two or more kinds of inks and one or more kinds of pretreatment liquids is exemplified.

According to such an embodiment, a multicolor image can be recorded.

Examples of two or more kinds of inks include three kinds of inks consisting of a cyan ink, a magenta ink, and a yellow ink; four kinds of inks consisting of a cyan ink, a magenta ink, a yellow ink, and a black ink; four or more kinds of inks consisting of the above-described three kinds of colored inks and at least one selected from a white ink, a green ink, an orange ink, a violet ink, a light cyan ink, a light magenta ink, and a light yellow ink; and five or more kinds of inks consisting of the above-described four kinds of colored inks and at least one selected from a white ink, a green ink, an orange ink, a violet ink, a light cyan ink, a light magenta ink, and a light yellow ink.

However, two or more kinds of inks are not limited to these specific examples.

<Pretreatment Liquid>

The pretreatment liquid in the ink set according to the embodiment of the present disclosure contains water and resin particles.

(Resin Particles)

The resin particles contained in the pretreatment liquid include at least one of a mixture of acrylic resin particles and polyester resin particles or composite particles containing an acrylic resin and a polyester resin.

That is, the resin particles contained in the pretreatment liquid include any one or both the mixture and the composite particles.

Here, a difference between the acrylic resin particles, the polyester resin particles, and the composite particles containing an acrylic resin and a polyester resin in the present disclosure will be described.

In the present disclosure, the acrylic resin particles indicate particles which contain an acrylic resin in each particle and do not contain a polyester resin in each particle. The proportion of the acrylic resin in the acrylic resin particles is preferably 90% by mass or greater.

In the present disclosure, the polyester resin particles indicate particles which contain a polyester resin in each particle and do not contain an acrylic resin in each particle. The proportion of the polyester resin in the polyester resin particles is preferably 90% by mass or greater.

In the present disclosure, the composite particles containing an acrylic resin and a polyester resin indicate particles containing both an acrylic resin and a polyester resin in each particle. The total proportion of the acrylic resin and the polyester resin in the composite particles is preferably 90% by mass or greater.

In the present disclosure, the acrylic resin indicates a polymer (a homopolymer or a copolymer) of a raw material monomer including at least one selected from the group consisting of acrylic acid, derivatives of acrylic acid (such as acrylic acid ester), methacrylic acid, and derivatives of methacrylic acid (such as methacrylic acid ester).

Further, in the present disclosure, the polyester resin indicates a polymer compound having an ester bond in the main chain.

Examples of the polyester resin include a polycondensate of a polyvalent carboxylic acid (such as a dicarboxylic acid) and polyalcohol (such as a diol).

Specific embodiments of the composite particles (that is, particles containing both an acrylic resin and a polyester resin in each particle) are not particularly limited.

Examples of the specific embodiments of the composite particles include an embodiment in which a polymer chain of an acrylic resin and a polymer chain of a polyester resin are entangled with each other.

Examples of the method of producing the composite particles include a method of mixing an aqueous dispersion liquid of a polyester resin with an aqueous dispersion liquid of an acrylic resin containing a glycidyl group; a method of polymerizing (homopolymerizing or copolymerizing) at least one kind of radically polymerizable unsaturated monomer containing a glycidyl group in an aqueous dispersion liquid of a polyester resin; and a method of copolymerizing a radically polymerizable unsaturated monomer containing a glycidyl group with another radically polymerizable unsaturated monomer in an aqueous dispersion liquid of a polyester resin.

The method of producing the composite particles can refer to known documents such as JP2010-143955A.

In the present disclosure, in a case of preparing a pretreatment liquid that contains composite particles, a commercially available product of an aqueous dispersion liquid of composite particles may be used as a raw material.

Examples of the aqueous dispersion liquid of the composite particles include PESRESIN A615GE and PESRESIN A613GE (both manufactured by Takamatsu Oil & Fat Co., Ltd.).

In the ink set according to the embodiment of the present disclosure, in a case where the pretreatment liquid contains composite particles containing an acrylic resin and a polyester resin, only one or two or more kinds of the composite particles may be contained.

In the ink set according to the embodiment of the present disclosure, in a case where the pretreatment liquid contains a mixture of acrylic resin particles and polyester resin particles, only one or two or more kinds of acrylic resin particles and only one or two or more kinds of polyester resin particles may be contained.

In the present disclosure, the expression "the resin particles contained in the pretreatment liquid include a mixture of the acrylic resin particles and the polyester resin particles" indicates that the pretreatment liquid includes both the acrylic resin particles and the polyester resin particles.

Therefore, as a raw material at the stage of preparing the pretreatment liquid, a mixture of the acrylic resin particles and the polyester resin particles or an aqueous dispersion liquid of this mixture does not necessarily need to be used, and the acrylic resin particles or an aqueous dispersion liquid thereof and the polyester resin particles or an aqueous dispersion liquid thereof may be separately used.

That is, the prepared pretreatment liquid may contain both the acrylic resin particles and the polyester resin particles.

In the present disclosure, in a case of preparing a pretreatment liquid containing a mixture of acrylic resin particles and polyester resin particles, an aqueous dispersion liquid of acrylic resin particles and/or an aqueous dispersion liquid of polyester resin particles may be used as a raw material.

Examples of a commercially available product of the aqueous dispersion liquid of acrylic resin particles include EM57DOC (manufactured by Daicel Finechem Ltd.).

As the aqueous dispersion liquid of acrylic resin particles, an aqueous dispersion liquid of acrylic resin particles may be selected from aqueous dispersion liquids of water-insoluble resin particles described in WO2017/163737A and used.

Examples of a commercially available product of the aqueous dispersion liquid of polyester resin particles include Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), and VYLONAL MD1200 (manufactured by Toyobo Co., Ltd.).

The mass ratio of the polyester resin to the acrylic resin (that is, the mass ratio [polyester resin/acrylic resin]; hereinafter, also referred to as the "E/A ratio") in the resin particles contained in the pretreatment liquid is not particularly limited.

The E/A ratio is preferably in a range of 0.05 to 20.

In a case where the E/A ratio is 0.05 or greater, the adhesiveness of the image is further improved.

In a case where the E/A ratio is 20 or less, the rub resistance of the image is further improved.

The E/A ratio is more preferably in a range of 0.1 to 10.

Here, the E/A ratio indicates the mass ratio [polyester resin/acrylic resin] in the total amount of the resin particles contained in the pretreatment liquid.

For example, in a case where the resin particles contained in the pretreatment liquid are formed of only composite particles containing an acrylic resin and a polyester resin, the E/A ratio corresponds to the mass ratio [polyester resin/acrylic resin] in the composite particles.

Further, in a case where the resin particles contained in the pretreatment liquid are formed of only a mixture of acrylic resin particles and polyester resin particles, the E/A ratio corresponds to the mass ratio [polyester resin particles/acrylic resin particles] in the pretreatment liquid.

The resin particles contained in the pretreatment liquid may include at least one kind of resin particles other than the mixture and the composite particles.

Examples of other resin particles include a polyurethane resin, a polyamide resin, a polyurea resin, a polycarbonate resin, a polyolefin resin, and a polystyrene resin.

The total ratio of the mixture (that is, the mixture of the acrylic resin particles and the polyester resin particles) and the composite particles (that is, the composite particles containing an acrylic resin and a polyester resin) in the resin particles contained in the pretreatment liquid is preferably 60% by mass or greater, more preferably 80% by mass or greater, and still more preferably 90% by mass or greater.

It is preferable that the resin particles contained in the pretreatment liquid include the composite particles.

In this manner, the adhesiveness of the image is further improved.

In a case where the resin particles contained in the pretreatment liquid include the composite particles, the proportion of the composite particles in the entirety of the mixture and the composite particles is preferably 60% by mass or greater, more preferably 80% by mass or greater, and still more preferably 90% by mass or greater.

The relationship between the glass transition temperature of the resin particles contained in the pretreatment liquid (hereinafter, also referred to as "$T_{gp}$") and the glass transition temperature of the resin particles contained in the ink described below (hereinafter, also referred to as "$T_{gi}$") is not particularly limited, but $T_{gi}-T_{gp}$ is higher than or equal to $-100°$ C., $T_{gi}-T_{gp}$ is preferably higher than $0°$ C. (that is, $T_{gi} \leq T_{gp}$), $T_{gi}-T_{gp}$ is more preferably higher than or equal to $20°$ C., and $T_{gi}-T_{gp}$ is still more preferably higher than or equal to $30°$ C.

In a case where "$T_{gi}<T_{gp}$" is satisfied, the adhesiveness of the image and the rub resistance of the image are further improved.

The upper limit of $T_{gi}-T_{gp}$ is not particularly limited, but the upper limit thereof is preferably $100°$ C.

Further, from the viewpoint of the manufacturing suitability of the resin particles, $T_{gp}$ is preferably $0°$ C. or higher (that is, "$0°$ C.$\leq T_{gp}$" is satisfied), more preferably $10°$ C. or higher, still more preferably $20°$ C. or higher, and even still more preferably $30°$ C. or higher.

From the viewpoint of improving the adhesiveness of the image, the upper limit of $T_{gp}$ is preferably $150°$ C. and more preferably $100°$ C.

In the present disclosure, the glass transition temperature of the resin particles indicates a value measured using a differential scanning calorimetry (DSC).

The specific measurement of the glass transition temperature is performed in conformity with the method described in JIS K 7121 (1987) or JIS K 6240 (2011).

The glass transition temperature in the present disclosure is the extrapolated glass transition starting temperature (hereinafter, also referred to as Tig).

The method of measuring the glass transition temperature will be described in more detail.

In a case where the glass transition temperature is acquired, the resin particles are maintained at a temperature lower than the expected Tg of the resin particles by approximately $50°$ C. until the device is stabilized, the resin particles are heated to a temperature higher than the temperature at which the glass transition is completed by approximately $30°$ C. at a heating rate of $20°$ C./min, and a differential thermal analysis (DTA) curve or a DSC curve is created.

The extrapolated glass transition starting temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

In the present disclosure, in a case where the pretreatment liquid contains two or more kinds of resin particles, the glass transition temperature ($T_{gp}$) of the resin particles contained in the pretreatment liquid indicates the weighted average value of the glass transition temperatures of individual resin particles contained in the pretreatment liquid.

Here, the weighted average value of the glass transition temperatures of individual resin particles contained in the pretreatment liquid can be acquired according to Mathematical Formula 1.

Specifically, in Mathematical Formula 1, the weighted average value of the glass transition temperatures of individual resin particles contained in the pretreatment liquid can be calculated as X in Mathematical Formula 1 by substituting the glass transition temperature of the i-th (i represents an integer of 1 or greater) resin particle contained in the pretreatment liquid for $S_i$ and substituting the mass fraction of the i-th resin particle in the entirety of the resin particles contained in the pretreatment liquid for $W_i$.

$$X = \frac{\Sigma S_i W_i}{\Sigma W_i} \qquad \text{(Mathematical Formula 1)}$$

It is preferable that the resin in the resin particles contained in the pretreatment liquid is a water-insoluble resin.

In the present disclosure, the term "water-insoluble" indicates a property in which a substance is not dissolved in water at a certain concentration or higher.

In the present specification, as the "water-insoluble" property, a property in which the amount of a substance to be dissolved in 100 g of water at $25°$ C. is less than 1.0 g (more preferably less than 0.5 g) is preferable.

Further, the relationship between the volume average particle diameter of the resin particles contained in the pretreatment liquid (hereinafter, also referred to as "$P_p$") and the volume average particle diameter of the resin particles contained in the ink described below (hereinafter, also referred to as "$P_i$") is not particularly limited, but $P_p-P_i$ is, for example, greater than or equal to $-120$ nm, $P_p-P_i$ is preferably greater than 0 (that is, $P_i<P_p$), $P_p-P_i$ is more preferably greater than or equal to 10 nm, and $P_p-P_i$ is still more preferably greater than or equal to 20 nm.

In a case where "$P_i<P_p$" is satisfied, the adhesiveness of the image and the rub resistance of the image are further improved.

The upper limit of $P_p-P_i$ is not particularly limited, but the upper limit thereof is preferably 100 nm.

In the case where "$P_i<P_p$" is satisfied, from the viewpoint of further improving the adhesiveness of the image and the rub resistance of the image, it is preferable that the relationship of $T_{gp}<T_{gi}$ is also satisfied.

In this case, more preferred embodiments of the relationship between $P_i$ and $P_p$ and the relationship between $T_{gp}$ and $T_{gi}$ are as described above.

The volume average particle diameter ($P_p$) of the resin particles contained in the pretreatment liquid is preferably in a range of 10 nm to 200 nm, more preferably in a range of 15 nm to 150 nm, and still more preferably in a range of 20 nm to 100 nm.

In the present disclosure, the volume average particle diameter indicates a value measured using a laser diffraction scattering particle size distribution analyzer.

As a measuring device, a particle size distribution measuring device "MICROTRAC MT-33001I" (manufactured by Nikkiso Co., Ltd.) is exemplified.

Further, in the present disclosure, in a case where the pretreatment liquid contains two or more kinds of resin particles, the volume average particle diameter ($P_p$) of the resin particles contained in the pretreatment liquid indicates the weighted average value of the volume average particle diameters (nm) of individual resin particles contained in the pretreatment liquid.

Here, the weighted average value of the volume average particle diameters (nm) of individual resin particles contained in the pretreatment liquid can be acquired according to Mathematical Formula 1.

Specifically, in Mathematical Formula 1, the weighted average value of the volume average particle diameters (nm) of individual resin particles contained in the pretreatment liquid can be calculated as X in Mathematical Formula 1 by substituting the volume average particle diameter (nm) of the i-th (i represents an integer of 1 or greater) resin particle contained in the pretreatment liquid for $S_i$ and substituting the mass fraction of the i-th resin particle in the entirety of the resin particles contained in the pretreatment liquid for $W_i$.

The weight-average molecular weights (Mw) of individual resins in the resin particles contained in the pretreatment liquid are respectively preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosho Corporation) as a measuring device, three columns of TSKgel (registered trademark) Super Multipore HZ-H (manufactured by Tosho Corporation, 4.6 mmID×15 cm), and tetrahydrofuran (THF) as an eluent. Further, as the measurement conditions, the measurement is performed at a sample concentration of 0.45% by mass, a flow rate of 0.35 ml/min, a sample injection volume of 10 ml, and a measurement temperature of 40° C. using a refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by TOSOH CORPORATION).

The resin in the resin particles contained in the pretreatment liquid has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, but is preferably in a range of 0.01 mol to 1.5 mol and more preferably in a range of 0.1 mol to 1 mol per 100 g of the resin.

It is preferable that the resin in the resin particles contained in the pretreatment liquid has an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, but is preferably in a range of 0.001 mol to 1.0 mol and more preferably in a range of 0.01 mol to 0.5 mol per 100 g of the resin.

The content of the resin particles is preferably in a range of 1% by mass to 25% by mass, more preferably in a range of 2% by mass to 20% by mass, and still more preferably in a range of 3% by mass to 15% by mass with respect to the total amount of the pretreatment liquid.

Further, in a case where the pretreatment liquid contains an aggregating agent described below, the content mass ratio of the resin particles to the aggregating agent (that is, the ratio [content mass of resin particles/content mass of aggregating agent]) is preferably in a range of 1 to 10, more preferably in a range of 1 to 8, and still more preferably in a range of 1 to 5.

(Water)

The pretreatment liquid contains water.

The content of water is preferably in a range of 50% by mass to 90% by mass and more preferably in a range of 60% by mass to 80% by mass with respect to the total amount of the pretreatment liquid.

(Aggregating Agent)

It is preferable that the pretreatment liquid further contains at least one aggregating agent selected from the group consisting of a polyvalent metal compound, an organic acid, a metal complex, and a water-soluble cationic polymer.

In a case where the pretreatment liquid contains an aggregating agent, the rub resistance of an image to be recorded is further improved. Specifically, in a case where an image is recorded by applying the pretreatment liquid and the ink in this order to the impermeable base material, the aggregating agent exerts a function of aggregating components in the ink on the impermeable base material. In this manner, the rub resistance of the image is improved.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumarinic acid, thiophene carboxylic acid, and nicotinic acid. These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid or tricarboxylic acid is more preferable.

As the polyvalent carboxylic acid, malonic acid, malic acid, maleic acid, succinic acid, glutaric acid, fumaric acid, tartaric acid, 4-methylphthalic acid, or citric acid is more preferable, and malonic acid, malic acid, tartaric acid, or citric acid is preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetylacetonate, methylacetoacetate, ethyl acetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Pharmaceutical Manufacture Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammonium chloride).

The water-soluble cationic polymer can refer to the descriptions in known documents such as JP2011-042150A (particularly, paragraph 0156) and JP2007-98610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-land CATIOMASTER PD-30 (both manufactured by Yokkaichi Chemical Co., Ltd.) and UNISENCE FPA100L (manufactured by Senka Corporation).

In the present disclosure, the term "water-soluble" indicates a property in which a substance is dissolved in water at a certain concentration or higher.

In the present disclosure, as the "water-soluble" property, a property in which the amount of a substance to be dissolved in 100 g of water at 25° C. is 5 g or greater (more preferably 10 g or greater) is preferable.

In a case where the pretreatment liquid contains an aggregating agent, the content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Water-Soluble Solvent)

It is preferable that the pretreatment liquid contains at least one water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of components, polyhydric alcohol or polyhydric alcohol ether is preferable, and alkanediol, polyalkylene glycol, or polyalkylene glycol ether is more preferable.

(Surfactant)

The pretreatment liquid may contain at least one surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine (fluorinated alkyl)-based surfactants and silicone-based surfactants described in JP2003-322926A, JP2004-325707A, and JP2004-309806A.

In a case where the pretreatment liquid contains a surfactant, the content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

For example, in a case where the pretreatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the pretreatment liquid.

(Other Components)

The pretreatment liquid may contain other components in addition to the above-described components as necessary.

Examples of other components that may be contained in the pretreatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(Physical Properties of Pretreatment Liquid)

In a case where the pretreatment liquid contains an aggregating agent, the pH of the pretreatment liquid at 25° C. is preferably in a range of 0.1 to 3.5 from the viewpoint of the aggregation rate of the ink.

In a case where the pH of the pretreatment liquid is 0.1 or greater, the roughness of the impermeable base material is further decreased and the adhesiveness of the image area is further improved.

In a case where the pH of the pretreatment liquid is 3.5 or less, the aggregation rate is further improved, coalescence of dots (ink dots) caused by the ink on the impermeable base material is further suppressed, and the roughness of the image is further decreased.

The pH (25° C.) of the pretreatment liquid is more preferably in a range of 0.2 to 2.0.

In the case where the pretreatment liquid contains an aggregating agent, from the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured using a VISCOMETER TV-22 (manufactured by TOKI SANGYO CO., LTD.) under a temperature condition of 25° C.

The surface tension of the pretreatment liquid at 25° C. is preferably 60 mN/m or less, more preferably in a range of 20 mN/m to 50 mN/m, and still more preferably in a range of 30 mN/m to 45 mN/m. In a case where the surface tension of the pretreatment liquid is in the above-described range, the adhesiveness between the impermeable base material and the pretreatment liquid is improved. The surface tension of the pretreatment liquid is measured using an Automatic Surface Tensiometer CBVP-Z (manufactured by Kyowa Interface Science Co., Ltd.) according to a plate method.

<Ink>

The ink in the ink set according to the embodiment of the present disclosure contains water, a colorant, and resin particles.

(Colorant)

The ink contains at least one colorant.

The colorant is not particularly limited, and any known colorant can be used. Among known colorants, an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (P) and a dispersant (s) (p:s) is preferably in a range of 1:0.06 to 1:3, more preferably in a range of 1:0.125 to 1:2, and still more preferably in a range of 1:0.125 to 1:1.5.

(Water)

The ink contains water.

The content of water is preferably in a range of 50% by mass to 90% by mass and more preferably in a range of 60% by mass to 80% by mass with respect to the total amount of the ink.

(Resin Particles)

The ink contains resin particles.

The resin particles contained in the ink include at least one of acrylic resin particles or polyurethane resin particles.

In this manner, as described above, the adhesiveness between the pretreatment liquid-derived layer and the ink-derived layer is enhanced in the recorded image. As a result, the adhesiveness between the image (that is, the image including the pretreatment liquid-derived layer and the ink-derived layer) and the impermeable base material is improved.

The resin particles contained in the ink include at least one of acrylic resin particles or polyurethane resin particles, and thus the strength of the ink-derived layer is increased. Therefore, the rub resistance of the image is improved.

Further, in a case where the pretreatment liquid contains the above-described aggregating agent, the ink thickens due to aggregation or dispersion instability of the resin particles in the ink in a case where the resin particles in the ink are brought into contact with the aggregating agent in the pretreatment liquid on the impermeable base material. In this manner, the image quality of the image is improved, and the speed of image recording is increased.

The acrylic resin particles which may be contained in the ink has the same definition as that for the acrylic resin particles which may be contained in the pretreatment liquid described above.

In the present disclosure, polyurethane resin particles indicate particles formed of a polyurethane resin.

In the present disclosure, the polyurethane resin indicates a polymer compound having a urethane bond in the main chain.

From the viewpoint of further improving the adhesiveness of the image, it is preferable that the resin particles contained in the ink include acrylic resin particles.

As the acrylic resin particles, acrylic resin particles which are self-dispersing resin particles are also preferable.

Examples of the self-dispersing resin particles include self-dispersing polymer particles described in paragraphs 0062 to 0076 of JP2016-188345A.

In a case where the resin particles contained in the ink include acrylic resin particles, the proportion of the acrylic resin particles in the resin particles contained in the ink is preferably 60% by mass or greater, more preferably 80% by mass or greater, and still more preferably 90% by mass or greater.

In a case where the proportion of the acrylic resin particles in the resin particles contained in the ink is 60% by mass or greater, the adhesiveness of the image is further improved.

The glass transition temperature ($T_{gi}$) of the resin particles contained in the ink is not particularly limited, but is preferably 150° C. or lower and more preferably 130° C. or lower from the viewpoint of the manufacturing suitability of the resin particles.

The lower limit of $T_{gi}$ is not particularly limited, but is, for example, 50° C. and preferably 80° C.

Further, the preferred embodiment of the relationship between $T_{gi}$ and $T_{gp}$ (the glass transition temperature of the resin particles contained in the pretreatment liquid) from the viewpoints of the adhesiveness of the image and the rub resistance of the image is as described above.

From the viewpoints of the adhesiveness of the image, the rub resistance of the image, the manufacturing suitability of the resin particles in the pretreatment liquid, and the manufacturing suitability of the resin particles in the ink, it is particularly preferable that the ink set according to the embodiment of the present disclosure satisfies the relationships of "0° C.≤$T_{gp}$", "$T_{gi}$≤150° C.", and "30° C.≤$T_{gi}$−$T_{gp}$".

In the present disclosure, in a case where the ink contains two or more kinds of resin particles, the glass transition temperature ($T_{gi}$) of the resin particles contained in the ink indicates the weighted average value of the glass transition temperatures of individual resin particles contained in the ink.

The definition of the weighted average value is as described above (see Mathematical Formula 1 described above).

Further, it is preferable that the resin in the resin particles contained in the ink is a water-insoluble resin.

The volume average particle diameter ($P_i$) of the resin particles contained in the ink is preferably in a range of 1 nm to 200 nm, more preferably in a range of 3 nm to 200 nm, and still more preferably in a range of 5 nm to 50 nm.

The method of measuring the volume average particle diameter of the resin particles is as described above.

Further, the preferred embodiment of the relationship between $P_i$ and $P_p$ (the volume average particle diameter of the resin particles contained in the pretreatment liquid) from the viewpoints of the adhesiveness of the image and the rub resistance of the image is as described above.

In the present disclosure, in a case where the ink contains two or more kinds of resin particles, the volume average particle diameter ($P_i$) of the resin particles contained in the ink indicates the weighted average value of the volume average particle diameters (nm) of individual resin particles contained in the ink.

The definition of the weighted average value is as described above (see Mathematical Formula 1 described above).

The weight-average molecular weights (Mw) of respective resins in the resin particles contained in the ink are respectively preferably in a range of 1000 to 300000, more preferably in a range of 2000 to 200000, and still more preferably in a range of 5000 to 100000.

The method of measuring the Mw is as described above.

The resin in the resin particles contained in the pretreatment liquid has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, but is preferably in a range of 0.01 mol to 1.5 mol and more preferably in a range of 0.1 mol to 1 mol per 100 g of the resin.

It is preferable that the resin in the resin particles contained in the ink contains an anionic group in the structure.

The anionic group is not particularly limited, but a carboxy group or a sulfo group is preferable, and a sulfo group is more preferable.

The amount of the anionic group is not particularly limited, but is preferably in a range of 0.001 mol to 1.0 mol and more preferably in a range of 0.01 mol to 0.5 mol per 100 g of the resin.

The content of the resin particles is preferably in a range of 1% by mass to 25% by mass, more preferably in a range of 2% by mass to 20% by mass, and still more preferably in a range of 3% by mass to 15% by mass with respect to the total amount of the ink.

(Water-Soluble Solvent)

It is preferable that the ink contains at least one water-soluble solvent.

In this manner, the effect of suppressing drying of the ink or the effect of wetting the ink can be obtained.

The water-soluble solvent that may be contained in the ink can be used, for example, as an anti-drying agent that prevents clogging due to aggregates formed by the ink being attached to an ink jet port of an injection nozzle and being dried.

From the viewpoints of suppressing drying and performing wetting, as the water-soluble solvent contained in the ink, a water-soluble solvent having a lower vapor pressure than that of water is preferable.

In addition, the boiling point of the water-soluble solvent at 1 atm (1013.25 hPa) is preferably in a range of 80° C. to 300° C. and more preferably in a range of 120° C. to 250° C.

As the anti-drying agent, a water-soluble solvent which has a lower vapor pressure than that of water is preferable.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% by mass to 50% by mass.

The water-soluble solvent may be used for adjusting the viscosity of the ink in addition to the use described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof (Other Additives)

The ink may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

As described above, the ink set according to the embodiment of the present disclosure described above is used for recording an image on the surface having a surface energy of 40 mN/m or greater and included in an impermeable base material as described above.

The recorded image has excellent adhesiveness and rub resistance.

Further, since the recorded image contains at least one of an acrylic resin or a polyurethane resin as a component derived from the ink, the image has excellent strength.

Therefore, an image recorded material comprising the impermeable base material and the image recorded on the surface of the impermeable base material also has excellent lamination strength (that is, peel strength) in a case where a base material for lamination is laminated on a side where the image is recorded. The reason for this is considered that since the image has excellent strength in addition to the excellent adhesiveness to the impermeable base material, the peeling of the impermeable base material and the base material for lamination from each other which is caused by destruction of the image is suppressed.

Therefore, the ink set according to the embodiment of the present disclosure can also be suitably used for recording an image in a laminate that comprises an image recorded material comprising an impermeable base material and an image recorded on the surface of the impermeable base material; and a base material for lamination which is laminated on a side where the image of the image recorded material is recorded.

Examples of the laminate and the method of producing the laminate will be described below.

[Image Recording Method]

Hereinafter, an example of an image recording method using the ink set according to the embodiment of the present disclosure will be described.

In the image recording method according to the present example, the ink set according to the embodiment of the present disclosure is used, and the method includes a step of applying the pretreatment liquid onto the surface of the impermeable base material having a surface with a surface energy of 40 mN/m or greater; and a step of applying the ink to at least a part of a region where the pretreatment liquid has been applied onto the surface of the impermeable base material.

The image recording method according to the embodiment of the present disclosure may include other steps as necessary.

According to the image recording method according to the embodiment of the present disclosure, an image having excellent adhesiveness and rub resistance can be recorded on the impermeable base material.

That is, according to the image recording method according to the embodiment of the present disclosure, an image recorded material comprising the impermeable base material and the image recorded on the surface of the impermeable base material, in which the image has excellent adhesiveness to the impermeable base material and excellent rub resistance can be produced.

The reason why the effects of exhibiting the adhesiveness and the rub resistance are obtained is as described above.

Hereinafter, each step of the image recording method according to the present example will be described.

<Step of Applying Pretreatment Liquid>

The step of applying the pretreatment liquid is a step of applying the pretreatment liquid onto the surface of the impermeable base material.

The application of the pretreatment liquid onto the impermeable base material can be performed by employing a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method which can be applied to a step of applying the ink described below.

The mass (g/m$^2$) of the pretreatment liquid to be applied per unit area is not particularly limited as long as the components in the ink can be aggregated, but is preferably in a range of 0.1 g/m$^2$ to 10 g/m$^2$, more preferably in a range of 0.5 g/m$^2$ to 6.0 g/m$^2$, and still more preferably in a range of 1.0 g/m$^2$ to 4.0 g/m$^2$.

Further, in the step of applying the pretreatment liquid, the impermeable base material may be heated before the application of the pretreatment liquid.

The heating temperature may be appropriately set according to the kind of the impermeable base material and the composition of the pretreatment liquid, but the temperature of the impermeable base material is set to be preferably in a range of 20° C. to 50° C. and more preferably in a range of 25° C. to 40° C.

In the step of applying the pretreatment liquid, the pretreatment liquid may be heated and dried after the application of the pretreatment liquid and before the step of applying the ink described below.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface to which the pretreatment liquid has been applied; a method of applying warm air or hot air to the surface of the impermeable base material to which the pretreatment liquid has been applied; a method of applying heat using an infrared heater from the surface of the impermeable base material to which the pretreatment liquid has been applied or from a side of the impermeable base material opposite to the surface to which the pretreatment liquid has been applied; and a method of combining a plurality of these methods.

The heating temperature of heating and drying the pretreatment liquid is preferably 35° C. or higher and more preferably 40° C. or higher.

The upper limit of the heating temperature is not particularly limited, and the upper limit thereof may be, for example, 100° C. and is preferably 90° C. and more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Step of Applying Ink>

The step of applying the ink is a step of applying the ink to at least a part of a region where the pretreatment liquid has been applied onto the surface of the impermeable base material.

The ink can be selectively applied onto the impermeable base material by performing the above-described step. In this manner, a desired image (specifically, a visible image) can be recorded.

In the present step, the ink may be applied onto the entire region where the pretreatment liquid has been applied or the ink may be applied to a part of the region where the pretreatment liquid has been applied. In a case where the ink is applied to a part of the region, an image is recorded on the part of the region where the pretreatment liquid has been applied, and the other part is an image non-recorded region.

In the step of applying the ink, only one or two or more kinds of inks may be applied to at least a part of the region where the pretreatment liquid of the impermeable base material has been applied. In a case where inks with two or more colors are applied in the step of applying ink, images with two or more colors can be recorded.

As the method of applying the ink in the step of applying the ink, a known method such as a coating method, an ink jet method, or an immersion method can be employed.

Among these, an ink jet method is preferable.

The method of jetting the ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by changing an electric signal into an acoustic beam and radiating the acoustic beam to the ink; and a thermal ink jet (bubble jet (registered trademark))

method of heating an ink to form bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the ink, according to the ink jet method, to the region where the pretreatment liquid of the impermeable base material has been applied is performed by jetting the ink from a nozzle of an ink jet head.

Examples of the system of the ink jet head include a shuttle system of performing recording while scanning a short serial head in the width direction of the impermeable base material and a line system of using a line head in which recording elements are aligned in correspondence with the entire area of one side of the impermeable base material.

In the line system, image recording can be performed on the entire surface of the impermeable base material by scanning the impermeable base material in a direction intersecting the direction in which the recording elements are aligned. In the line system, a transport system such as a carriage that scans a short head is not necessary. Further, in the line system, since movement of a carriage and complicated scanning control between the head and the impermeable base material are not necessary as compared with the shuttle system, only the impermeable base material moves. Therefore, according to the line system, image recording at a higher speed than that of the shuttle system can be realized.

From the viewpoint of obtaining an image with high definition, the liquid droplet amount of ink jetted from the nozzle of the ink jet head is preferably in a range of 1 pL (pico liter) to 10 pL and more preferably in a range of 1.5 pL to 6 pL.

In addition, from the viewpoints of improving the image irregularity and improving connection of continuous gradations, it is also effective that the ink is jetted by combining different amounts of liquid droplets.

In the step of applying the ink, the applied ink may be heated and dried.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface to which the ink has been applied; a method of applying warm air or hot air to the surface of the impermeable base material to which the ink has been applied; a method of applying heat using an infrared heater from the surface of the impermeable base material to which the ink has been applied or from a side of the impermeable base material opposite to the surface to which the pretreatment liquid has been applied; and a method of combining a plurality of these methods.

The heating temperature of heating and drying the ink is preferably 55° C. or higher, more preferably 60° C. or higher, and particularly preferably 65° C. or higher.

The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

In the step of applying the ink, the impermeable base material (specifically, the impermeable base material to which the pretreatment liquid has been applied in the step of applying the pretreatment liquid) may be heated before the application of the ink.

The heating temperature may be appropriately set according to the kind of the impermeable base material and the composition of the ink, but the temperature of the impermeable base material is set to be preferably in a range of 20° C. to 50° C. and more preferably in a range of 25° C. to 40° C.

In the step of applying the pretreatment liquid, in a case where the pretreatment liquid is heated and dried, the heating for heating and drying the pretreatment liquid may also serve as the heating of the impermeable base material before the application of the ink.

[Method of Producing Laminate]

As described above, the ink set according to the embodiment of the present disclosure is also suitable for recording of an image in the laminate which comprises an image recorded material comprising the impermeable base material and the image recorded on the surface of the impermeable base material, and a base material for lamination which is laminated a side where the image of the image recorded material is recorded.

Hereinafter, an example of a method of producing the laminate will be described.

A method of producing the laminate according to the present example includes a step of obtaining an image recorded material which comprises the impermeable base material and the image recorded on the surface of the impermeable base material using the image recording method according to the example described above; and a step of laminating the base material for lamination on a side where the image of the image recorded material is recorded to obtain a laminate.

According to the method of producing a laminate according to the present example, a laminate having excellent lamination strength between the image recorded material and the base material for lamination can be produced.

The reason why such effects are obtained is considered that, as described above, the adhesiveness between the impermeable base material and the image is excellent and the peeling of the impermeable base material and the base material for lamination from each other which is caused by destruction of the image is suppressed.

The step of obtaining an image recorded material can refer to the image recording method according to the above-described example.

The step of obtaining a laminate is a step of laminating a base material for lamination on a side where the image of the image recorded material is recorded to obtain a laminate.

As the base material for lamination, a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The shape of the resin base material is not particularly limited, but it is preferable that the resin base material is in the form of a sheet.

The thickness of the resin base material is preferably in a range of 10 µm to 200 µm and more preferably in a range of 10 µm to 100 µm.

In the present step, the base material for lamination may be laminated directly on a side where the image of the image recorded material is recorded or through another layer (for example, an adhesive layer).

The base material for lamination in a case of being directly laminated on a side where the image of the image recorded material is recorded can be laminated according to a known method such as thermocompression bonding or thermal fusion.

Further, the base material for lamination in a case of being laminated through an adhesive layer on a side where the image of the image recorded material is recorded can be laminated according to, for example, a method of coating the side where the image of the image recorded material with an adhesive, placing the base material for lamination, and attaching the image recorded material to the base material for lamination.

Further, the base material for lamination in the case of being laminated through an adhesive layer on a side where the image of the image recorded material is recorded can be laminated according to an extrusion lamination method (that is, sandwich lamination) or the like.

It is preferable that the adhesive layer in the mode of laminating the base material through the adhesive layer on a side where the image of the image recorded material is recorded contains an isocyanate compound.

In a case where the adhesive layer contains an isocyanate compound, since the adhesiveness between the adhesive layer and the ink-derived layer of the image is further improved, the lamination strength can be further improved.

[Image Recorded Material]

The image recorded material according to an example of the present disclosure comprises an impermeable base material which has a surface with a surface energy of 40 mN/m or greater; and an image recorded on the surface of the impermeable base material, and the image includes a layer A containing at least one of an acrylic resin or a polyurethane resin and a colorant and a layer B containing an acrylic resin and a polyester resin and disposed between the layer A and the impermeable base material.

Here, the interface between the layer A and the layer B does not necessarily need to be clear. For example, in the image of the image recorded material according to the present example, the composition may be continuously changed between the layer A and the layer B in the thickness direction of the image.

The image of the image recorded material according to the present example has excellent adhesiveness to the impermeable base material and excellent rub resistance.

The reason why such effects are exhibited are assumed as follows. However, the image recorded material according to the present example is not limited for the following reasons.

It is considered that since the polyester resin in the layer B is a resin having an ester bond which is a polar group in the main chain, the polyester resin has an excellent interaction with the surface of the impermeable base material with a surface energy of 40 mN/m or greater. Therefore, the polyester resin in the layer B is considered to contribute to improving the adhesiveness between the pretreatment liquid-derived layer and the impermeable base material.

Meanwhile, it is considered that since the acrylic resin in the layer B has a chemical structure that is the same as or similar to the chemical structure of the acrylic resin and/or the polyurethane resin in the layer A, the acrylic resin in the layer B has an excellent interaction with the acrylic resin and/or the polyurethane resin. Therefore, the acrylic resin in the layer B is considered to contribute to improving the adhesiveness between the layer A and the layer B.

As described above, it is considered that the adhesiveness between the impermeable base material and the layer B is enhanced, the adhesiveness between the layer B and the layer A is also enhanced, and thus the adhesiveness between the impermeable base material and the image including the layer B and the layer A is enhanced.

Further, the reason why the effect of improving the rub resistance of the image is obtained is considered that the acrylic resin and/or the polyurethane resin in the layer A is a resin with excellent strength as compared with a polyester resin or the like, and as a result, the strength of the layer A having the surface of the image is increased.

The image recorded material according to the above-described example can be suitably produced using the image recording method according to the above-described example.

In this case, the layer A can be formed as an ink-derived layer, and layer B can be formed as a pretreatment liquid-derived layer.

The layer A does not substantially contain a liquid component such as water or the content of the liquid component is extremely reduced. Further, the form of the acrylic resin and/or the polyurethane resin in the layer A is not limited to the form of resin particles. Except for these points, the preferred embodiments of the components in the layer A are the same as the preferred embodiments of the components in the ink.

The layer B does not substantially contain a liquid component such as water or the content of the liquid component is extremely reduced. Further, the form of the acrylic resin and the polyester resin in the layer B is not limited to the form of resin particles. Except for these points, the preferred embodiments of the components in the layer B are the same as the preferred embodiments of the components in the pretreatment liquid.

[Laminate]

The laminate according to an example of the present disclosure comprises the image recorded material according to the above-described example; and the base material for lamination which is laminated on a side where the image of the image recorded material is recorded.

The laminate according to the above-described example has excellent lamination strength (that is, peel strength) between the image recorded material and the base material for lamination.

The reason why such effects are obtained is considered that the adhesiveness between the impermeable base material and the image is excellent and the peeling of the impermeable base material and the base material for lamination from each other which is caused by destruction of the image is suppressed. However, the laminate according to the above-described example is not limited for this reason.

The base material for lamination may be laminated directly on a side where the image of the image recorded material is recorded or through another layer (for example, an adhesive layer).

The preferred embodiments of the base material for lamination and the adhesive layer are respectively as described in the section of the method of producing a laminate.

[One Example of Image Recording Device]

Hereinafter, an example of the image recording device which can be suitably used for the image recording method according to the example of the present disclosure will be described with reference to FIG. 1.

FIG. 1 is a view conceptually illustrating an example of the image recording device.

As illustrated in FIG. 1, the image recording device according to the present example is a device which unwinds a long impermeable base material S1 wound in a roll shape by an unwinding device W1, transports the unwound impermeable base material S1 in the direction indicated by the block arrow, allows the impermeable base material to pass through a pretreatment liquid applying device A1, a pretreatment liquid drying zone Dry1, an ink jet ink applying device IJ1, and an ink drying zone Dry2 in this order, and finally winds the impermeable base material using a winding device W2.

In addition, since FIG. 1 is a conceptual view, the view is illustrated such that the impermeable base material S1 is transported in one direction by simplifying the transport path of the impermeable base material S1. Practically, it goes without saying that the transport path of the impermeable base material S1 may meander. The method of transporting the impermeable base material S1 can be appropriately selected from various web transport methods of using a drum, a roller, and the like.

The step of applying the pretreatment liquid in the image recording method according to the above-described example is performed using the pretreatment liquid applying device A1 and the pretreatment liquid drying zone Dry1. The pretreatment liquid drying zone Dry1 may be omitted.

The method and the conditions exemplified in the section of "the image recording method" can be employed as the method and the conditions for applying the pretreatment liquid using the pretreatment liquid applying device A1.

The method and the conditions exemplified in the section of "the image recording method" can be employed as the method and the conditions for drying the pretreatment liquid in the pretreatment liquid drying zone Dry1.

Further, a surface treatment unit (not illustrated) for performing a surface treatment (preferably, a corona treatment) on the impermeable base material S1 may be provided on the upstream side of the impermeable base material S1 in the transport direction with respect to the pretreatment liquid applying device A1.

The step of applying the above-described ink is performed using the ink applying device IJ1 and the ink drying zone Dry2. The ink drying zone Dry2 may be omitted.

The method and the conditions exemplified in the section of the step of applying the ink can be employed as the method and the conditions for applying the ink using the ink applying device IJ1.

The method and the conditions exemplified in the section of the step of applying the ink can be employed as the method and the conditions for drying the ink in the ink drying zone Dry2.

Although not illustrated, the structure of the ink applying device IJ1 may be a structure comprising at least one ink jet head.

The ink jet head may be a shuttle head, but a line head in which a large number of jet ports (nozzles) are aligned in the width direction of a long impermeable base material is preferable as the ink jet head from the viewpoint of increasing the speed of image recording.

From the viewpoint of increasing the speed of image recording, it is preferable that the structure of the ink applying device IJ1 is a structure comprising at least one of a line head for black (K) ink, a line head for cyan (C) ink, a line head for magenta (M) ink, or a line head for yellow (Y) ink.

As the structure of the ink applying device Ill, a structure which comprises at least two of the above-described four line heads and in which two or more of these line heads are aligned in the transport direction of the impermeable base material (the direction indicated by the block arrow) is more preferable.

The ink applying device IJ1 may further comprise at least one of a line head for white ink, a line head for orange ink, a line head for green ink, a line head for purple ink, a line head for light cyan ink, or a line head for light magenta ink.

As described above, in the image recording device according to the present example, an image can be recorded by unwinding the long impermeable base material S1 wound in a roll shape using the unwinding device W1 and transporting the unwound impermeable base material S1 in the direction indicated by the block arrow, applying and drying the pretreatment liquid using the pretreatment liquid applying device A1 and the pretreatment liquid drying zone Dry1, and applying and drying the ink using the ink jet ink applying device IJ1 and the ink drying zone Dry2. The impermeable base material S1 (that is, the image recorded material) on which the image has been recorded is wound by the winding device W2.

EXAMPLES

Hereinafter, the present invention will be described in more detail based on examples, but the present invention is not limited to the following examples unless the gist thereof is overstepped. Further, "parts" and "%" are on a mass basis unless otherwise specified.

<Preparation of Aqueous Dispersion Liquid of Resin Particles for Preparing Pretreatment Liquid>

The following aqueous dispersion liquid of resin particles for preparing a pretreatment liquid was prepared.

The pretreatment liquids of examples and comparative examples (excluding Comparative Example 3) described below were prepared using these aqueous dispersion liquids.

Aqueous dispersion liquid of composite particles AE1 . . . "PESRESIN A615GE", manufactured by Takamatsu Oil & Fat Co., Ltd. (aqueous dispersion liquid of composite particles AE1 containing acrylic resin and polyester resin)

Aqueous dispersion liquid of composite particles AE2 . . . "PESRESIN A613GE", manufactured by Takamatsu Oil & Fat Co., Ltd. (aqueous dispersion liquid of composite particles AE2 containing acrylic resin and polyester resin)

Aqueous dispersion liquid of polyester resin particles E1 . . . "Eastek 1100" manufactured by Eastman Chemical Company (aqueous dispersion liquid of polyester resin particles E1 (volume average particle diameter of 30 nm, glass transition temperature of 55° C.))

Aqueous dispersion liquid of acrylic resin particles A1 . . . Aqueous dispersion liquid of acrylic resin particles A1 (glass transition temperature of 140° C., volume average particle diameter of 50 nm) prepared as follows.

Aqueous dispersion liquid of acrylic resin particles A2 . . . "EM57DOC", manufactured by Daicel Finechem Ltd. (aqueous dispersion liquid of acrylic resin particles A2 (glass transition temperature of 34° C., volume average particle diameter of 70 nm))

(Preparation of Aqueous Dispersion Liquid of Acrylic Resin Particles A1)

An aqueous dispersion liquid of the acrylic resin particles A1 was prepared according to paragraph 0217 of WO2017/163737A (synthesis of water-insoluble resin particles A-22). Hereinafter, the details will be described.

1.5 g of sodium dodecyl benzene sulfonate (62 mass % aqueous solution, manufactured by Tokyo Chemical Industry Co., Ltd.) and 130 g of water were added to a 500 mL three-neck flask provided with a stirrer and a cooling pipe, and the solution was heated to 90° C. in a nitrogen atmosphere. A solution A obtained by dissolving 8.27 g of a 50 mass % aqueous solution of sodium 2-acrylamide-2-methylpropane sulfonate (manufactured by Sigma-Aldrich Co., LLC) in 20 g of water, a solution B obtained by mixing 8.27 g of methyl methacrylate (MMA; manufactured by Wako Pure Chemical Industries, Ltd.), 16.55 g of methacrylic acid (manufactured by Wako Pure Chemical Industries, Ltd.), 12.41 g of styrene, and 0.708 g of dodecanethiol (chain transfer agent), and a solution C obtained by dissolving 6.0 g of sodium persulfate (manufactured by Wako Pure Chemical Industries, Ltd.) in 40 g of water were simultaneously added dropwise to the heated mixed solution in the three-neck flask for 3 hours. After the dropwise addition, the resulting solution was allowed to further react for 3 hours, thereby obtaining an aqueous dispersion liquid of the acrylic resin particles A1 (solid content: 19.8% by mass).

The mass ratio [polyester resin/acrylic resin] (hereinafter, also referred to as the "E/A ratio"), the glass transition temperature $T_{gp}$ (° C.), and the volume average particle diameter $P_p$ (nm) of the resin particles in the pretreatment liquid are listed in Table 1.

The volume average particle diameter (nm) of the mixture of the acrylic resin particles and the polyester resin particles is a weighted average value of the volume average particle diameter (nm) of the acrylic resin particles and the volume average particle diameter (nm) of the polyester resin particles.

The glass transition temperature $T_{gp}$ (° C.) of the mixture of the acrylic resin particles and the polyester resin particles is a weighted average value of the glass transition temperature (° C.) of the acrylic resin particles and the glass transition temperature (° C.) of the polyester resin particles.

<Preparation of Aqueous Dispersion Liquid of Resin Particles for Preparing Ink>

The following aqueous dispersion liquid of resin particles for preparing an ink was prepared. An ink of each example was prepared using any of these aqueous dispersion liquids.

Aqueous dispersion liquid of acrylic resin particles IA-1 . . . Aqueous dispersion liquid of acrylic resin particles IA-1 prepared as follows.

Aqueous dispersion liquid of acrylic resin particles IA-2 . . . "MOVINYL (registered trademark) 972", manufactured by Japan Coating Resin Co., Ltd.

Aqueous dispersion liquid of acrylic resin particles IA-3 . . . "MOVINYL (registered trademark) 966A", manufactured by Japan Coating Resin Co., Ltd.

Aqueous dispersion liquid of polyurethane resin particles IU-1 "SUPERFLEX (registered trademark) 130", manufactured by DKS Co., Ltd.

Aqueous dispersion liquid of polyester resin particles IE-1 (comparative example) . . . "PLASCOAT (registered trademark) Z690", manufactured by Goo Chemical Co., Ltd.

(Preparation of Aqueous Dispersion Liquid of Acrylic Resin Particles IA-1)

Acrylic resin particles IA-1 were produced as follows.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Wako Pure Chemical Industries, Ltd., dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained solution.

The obtained liquid was filtered using a filter having a mesh diameter of 1 and the filtrate was collected, thereby obtaining an aqueous dispersion liquid of the acrylic resin particles IA-1 whose concentration of solid contents was 26.5% by mass.

The glass transition temperature $T_{gi}$ (° C.) and the volume average particle diameter $P_i$ (nm) of the resin particles for preparing the ink are listed in Table 1.

Example 1

An ink set formed of the following pretreatment liquid and the following cyan ink was prepared.
<Preparation of Pretreatment Liquid>
A pretreatment liquid with the following composition was prepared.
—Composition of Pretreatment Liquid—
Composite particles AE1 (resin particles) . . . 10% by mass as amount of resin particles
1,2-Propanediol (manufactured by Wako Pure Chemical Industries, Ltd.) (water-soluble solvent) . . . 10% by mass
Antifoaming agent (TSA-739 (15% by mass), manufactured by Momentive Performance Materials Japan LLC, emulsion type silicon antifoaming agent) . . . 0.01% by mass as solid content of antifoaming agent
Water . . . remaining amount set such that total amount was 100% by mass
<Preparation of Cyan Ink>
A cyan ink with the following composition was prepared.
<Composition of Cyan Ink>
Projet Cyan APD1000 (manufactured by FUJIFILM Imaging Colorants Inc., cyan pigment dispersion liquid, pigment concentration: 12% by mass) . . . 2.4% by mass as solid content
1,2-Propanediol (manufactured by Wako Pure Chemical Industries, Ltd.) (water-soluble solvent) . . . 20% by mass
OLFINE E1010 (manufactured by Nissan Chemical Co., Ltd.) (surfactant) . . . 1% by mass
Acrylic resin particles IA-1 (resin particles) . . . 8% by mass as amount of resin particles
SNOWTEX (registered trademark) XS (manufactured by Nissan Chemical Co., Ltd., colloidal silica) . . . 0.06% by mass as solid content of silica
Water . . . remaining amount set such that total amount was 100% by mass
<Image Recording>
Image recording was performed using the above-described ink set (that is, the pretreatment liquid and cyan ink) and a polyethylene terephthalate (PET) base material as the impermeable base material.

The image recording device illustrated in FIG. 1 according to the above-described example was used as the image recording device.

As the impermeable base material S1, a PET base material "FE2001" (manufactured by Futamura Chemical Co., Ltd., thickness of 25 μm, simply referred to as "PET" in Table 1) was used.

In FE2001 (PET), the surface tension of the surface to which the pretreatment liquid is applied is as listed in Table 1.

Here, a method of measuring the surface tension of the surface to which the pretreatment liquid is applied is as described above (the same applies to "OPP" and "NY" in Table 1).

The transport speed of the impermeable base material S1 (that is, the traveling speed of the impermeable base material S1) was 635 mm/sec.

As the pretreatment liquid applying device A1, a wire bar coater was used.

Warm air drying was used as the drying method in the pretreatment liquid drying zone Dry1.

The ink jet head and the ink jetting conditions for the ink applying device IJ1 were as follows.
Ink jet head: 1200 dpi (dot per inch, 1 inch is 2.54 cm)/20-inch width piezo full line head (total number of nozzles: 2048) was used.
Ink droplet amount: Each amount was set to 2.4 pL.
Driving frequency: 30 kHz.

Hot air drying was used as the drying method in the ink drying zone Dry2.

First, a roll body (hereinafter, also referred to as a "roll body 1") in which the impermeable base material S1 (the above-described PET base material "FE2001") having a thickness of 25 μm, a width of 500 mm, and a length of 2000 m was wound in a roll shape was prepared. The roll body 1 was set in the unwinding device W1.

Further, the pretreatment liquid described above was set in the pretreatment liquid application device A1, and the cyan ink was set in the ink applying device IJ1.

(Step of Applying Pretreatment Liquid)
The impermeable base material S1 was unwound from the roll body 1 by the unwinding device W1, and the unwound impermeable base material S1 was transported at the above-described transport speed.

One surface of the impermeable base material S1 during the transport was entirely coated with the pretreatment liquid using the pretreatment liquid applying device A1 such that the mass of the pretreatment liquid to be applied per unit area was set to 1.7 g/m². The applied pretreatment liquid was dried at 80° C. for 3 seconds in the pretreatment liquid drying zone Dry1.

(Step of Applying Ink)
Next, the cyan ink was applied in the form of a solid image to a part of the region (that is, the entire one surface) where the pretreatment liquid of the impermeable base material S1 had been applied using the ink applying device IJ1 according to the ink jet method. Here, the region where the cyan ink was applied was set as a band-shaped region having a width of 250 mm with a central portion in the width direction as a center in a total width of 500 mm of the impermeable base material S1. Here, the mass of the cyan ink to be applied per unit area in the region where the cyan ink was applied was set to 3 g/m².

Next, the applied cyan ink was dried at 80° C. for 8 seconds in the ink drying zone Dry2.

As described above, a cyan solid image was recorded on the entire band-shaped region having a width of 250 mm described above. Each of the regions with a width of 125 mm at both ends of the impermeable base material S1 in the width direction was an image non-recording region.

Finally, the impermeable base material S1 (that is, the image recorded material) on which the cyan solid image was recorded was wound by a winding device W2 under a condition of a winding pressure (surface pressure) of 50 kPa.

Hereinafter, the wound image recorded material will be referred to as a "roll body 2".

The image recorded material was unwound from the roll body 2, and the following evaluations were performed using the unwound image recorded material.

<Evaluation of Adhesiveness of Image>
In the image recorded material unwound from the roll body 2, a region with a length of 500 mm in the longitudinal direction and a width of 500 mm (that is, the entire width of the image recorded material) at a position separated from one end in the longitudinal direction by 1000 m in the longitudinal direction was selected as a region for evaluating the adhesiveness.

In the region for evaluating the adhesiveness, the "length in the longitudinal direction" indicates the length of the region for evaluating the adhesiveness in the longitudinal direction of the image recorded material (that is, the longitudinal direction of the impermeable base material S1), and the "width" indicates the length of the region for evaluating the adhesiveness in the width direction of the image recorded material (that is, the width direction of the impermeable base material S1) (the same applies to a region for evaluating the rub resistance and a region for evaluating the lamination described below).

Next, the region for evaluating the adhesiveness was cut out from the image recorded material and used as sample for evaluating the adhesiveness.

Next, the adhesiveness of the image was evaluated by attaching a piece of Cellotape (registered trademark, No. 405, manufactured by Nichiban Co., Ltd., width of 12 mm, hereinafter, also simply referred to as "tape") onto the cyan solid image in the sample for evaluating the adhesiveness and peeling the piece of tape off from the cyan solid image.

Specifically, the tape was attached and peeled off according to the following method.

The tape was taken out at a constant speed and cut to have a length of approximately 75 mm, thereby obtaining a piece of tape.

The obtained piece of tape was superimposed on the cyan solid image, and a region at the central portion of the piece of tape with a width of 12 nm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the piece of peeled tape and the presence or absence of peeling of the cyan solid image on the impermeable base material in the sample for evaluating the adhesiveness were visually observed, and the adhesiveness of the image was evaluated according to the following evaluation standards.

The results are listed in Table 1.

—Evaluation Standards for Adhesiveness of Image—

5: Adhesive matter was not found on the piece of tape, and peeling of the image on the impermeable base material was not found.

4: A small amount of colored adhesive matter was found on the piece of tape, but peeling of the image on the impermeable base material was not found.

3: A small amount of colored adhesive matter was found on the piece of tape, and slight peeling of the image on the impermeable base material was found, but it was in a practically acceptable range.

2: Colored adhesive matter was found on the piece of tape, peeling of the image on the impermeable base material was found, and it was out of a practically acceptable range.

1: Colored adhesive matter was found on the piece of tape, most of the image on the impermeable base material was peeled off, and the impermeable base material was visually recognized.

<Rub Resistance of Image>

In the image recorded material unwound from the roll body 2, a region with a length of 500 mm in the longitudinal direction and a width of 500 mm at a position adjacent to one end side of the image recorded material in the longitudinal direction with respect to the region for evaluating the adhesiveness described above was selected as a region for evaluating the rub resistance.

The region for evaluating the rub resistance was cut out from the image recorded material and used as a sample for evaluating the rub resistance.

General paper "OK TOPCOAT MAT N" (basis weight of 127.9 g/m$^2$, manufactured by Oji Paper Co., Ltd.) was superimposed on the cyan solid image in the sample for evaluating the rub resistance, and the paper was reciprocatingly rubbed 10 times with a load of 200 g.

The cyan solid image was visually observed every time one reciprocation was completed, and the rub resistance of the image was evaluated based on the following evaluation standards.

—Evaluation Standards for Rub Resistance of Image—

5: No scratches occur on the image after reciprocating rubbing 10 times.

4: Although slight scratches were found on the image after reciprocating rubbing 10 times, but the appearance of the entire image was not affected.

3: Damage to the extent of affecting the appearance of the entire image occurred due to reciprocating rubbing performed 8 times to 10 times.

2: Damage to the extent of affecting the appearance of the entire image occurred due to reciprocating rubbing performed 5 times to 7 times.

1: Damage to the extent of affecting the appearance of the entire image occurred due to reciprocating rubbing performed once to 4 times.

<Lamination Strength>

In the image recorded material unwound from the roll body 2, a region with a length of 500 mm in the longitudinal direction and a width of 500 mm at a position adjacent to the other end side of the image recorded material in the longitudinal direction with respect to the region for evaluating the adhesiveness was selected as a region for evaluating the lamination strength.

The region for evaluating the lamination strength was cut out from the image recorded material and used as a sample for evaluating the lamination strength.

The cyan solid image in the sample for evaluating the lamination strength was coated with an adhesive for dry lamination (main agent TM-320 (isocyanate compound)/curing agent CAT-13B (alcohol compound), manufactured by Toyo Morton, Ltd.) using a bar coater, and an unstretched polypropylene (CPP) film (trade name: PYLEN P1128, manufactured by Toyobo Co., Ltd., thickness of 25 µm) was superimposed thereon as a base material for lamination. In this state, the base material for lamination and the sample for evaluating the lamination strength were attached to each other, thereby obtaining a laminate.

The obtained laminate was aged at 40° C. for 48 hours.

A sample piece having a length of 100 mm and a width of 15 mm was cut out from the aged laminate.

Next, the base material for lamination and the sample for evaluating the lamination strength in a region from the one end in the longitudinal direction to a length of 30 mm in the sample piece were peeled by hand. The remaining region with a length of 70 mm was allowed to remain in a state where the base material for lamination and the sample for evaluating the lamination strength were attached to each other.

Next, a tensile test of stretching the peeled portion of the base material for lamination and the peeled portion of the sample for evaluating the lamination strength in opposite directions in the sample piece was performed. The stretching direction was a direction perpendicular to the above-described remaining region with a length of 70 mm (the remaining region in a state where the base material for lamination and the sample for evaluating the lamination strength were attached to each other).

The peel strength for peeling the base material for lamination and the sample for evaluating the laminate strength in the remaining region with a length of 70 mm was acquired by performing the tensile test, and the obtained peel strength was set as the lamination strength.

Based on the obtained lamination strength, the lamination strength between the sample for evaluating the lamination strength (that is, the image recorded material) and the base material for lamination was evaluated based on the following evaluation standards.

The results are listed in Table 1.

Further, the tensile test was performed using a tensile tester (TENSILON RTM-25, manufactured by Orientec Co., Ltd.).

—Evaluation Standards for Lamination Strength—

5: The lamination strength between the image recorded material and the base material for lamination was 2 N/15 mm or greater.

4: The lamination strength between the image recorded material and the base material for lamination was 1.5 N/15 mm or greater and less than 2 N/15 mm.

3: The lamination strength between the image recorded material and the base material for lamination was 1 N/15 mm or greater and less than 1.5 N/15 mm.

2: The lamination strength between the image recorded material and the base material for lamination was 0.5 N/15 mm or greater and less than 1 N/15 mm.

1: The lamination strength between the image recorded material and the base material for lamination was less than 0.5 N/15 mm.

Example 2

The same operation as in Example 1 was performed except that an aggregating agent listed in Table 1 (malonic acid; organic acid manufactured by Wako Pure Chemical Industries, Ltd.) was added to the pretreatment liquid.

The results are listed in Table 1.

In Example 2, the content (% by mass) of the aggregating agent with respect to the total amount of the pretreatment liquid was set to 5% by mass, and the content (% by mass) of each component (for example, resin particles) other than the aggregating agent and water with respect to the total amount of the pretreatment liquid was adjusted to be the same as the content (% by mass) in Example 1.

Example 3

The same operation as in Example 2 was performed except that the resin particles (composite particles AE1) in the pretreatment liquid were changed to resin particles with the same mass listed in Table 1.

The results are listed in Table 1.

Examples 4 to 6

The same operation as in Example 2 was performed except that the aggregating agent was changed to the aggregating agent with the same mass listed in Table 1.

The results are listed in Table 1.

The aggregating agents listed in Table 1 are as follows.

TC-310 . . . "ORGATIX TC-310" (manufactured by Matsumoto Fine Chemical Co., Ltd., titanium lactate, metal complex)

PD-7 . . . CATIOMASTER (registered trademark) PD-7 (manufactured by Yokkaichi Chemical Co., Ltd.; poly-2-hydroxypropyldimethylammonium chloride)

$CaCl_2$) . . . $CaCl_2$) (polyvalent metal salt, manufactured by Wako Pure Chemical Industries, Ltd.)

Example 7

The same operation as in Example 2 was performed except that the resin particles (composite particles AE1) in the pretreatment liquid were changed to the polyester resin particles E1 and the acrylic resin particles A1 (that is, a mixture with an "E/A ratio" listed in Table 1) with the same mass.

The results are listed in Table 1.

Example 8

The same operation as in Example 7 was performed except that the E/A ratio in the mixture was changed as listed in Table 1.

The results are listed in Table 1.

Example 9

The same operation as in Example 7 was performed except that the mixture of the polyester resin particles E1 and the acrylic resin particles A1 was changed to a mixture of the polyester resin particles E1 and the acrylic resin particles A2 (the "E/A ratio" is as listed in Table 1) with the same mass.

The results are listed in Table 1.

Examples 10 and 11

The same operation as in Example 2 was performed except that the resin particles (acrylic resin particles IA-1) in the ink were changed to resin particles with the same mass listed in Table 1.

The results are listed in Table 1.

Examples 12 and 13

The same operation as in Example 7 was performed except that the E/A ratio in the mixture was changed as listed in Table 1.

The results are listed in Table 1.

Example 14

The same operation as in Example 2 was performed except that the resin particles (acrylic resin particles IA-1) in the ink were changed to resin particles with the same mass listed in Table 1.

The results are listed in Table 1.

Examples 15 and 16

The same operation as in Example 2 was performed except that the impermeable base material was changed to the impermeable base material listed in Table 1.

The results are listed in Table 1.

In Table 1, OPP and NY as impermeable base materials are respectively as follows.

Further, in these impermeable base materials, the surface tension of the surface to which the pretreatment liquid is applied is as listed in Table 1.

OPP . . . "P2161", biaxially oriented polypropylene (OPP) base material (manufactured by Toyobo Co., Ltd., thickness of 25 μm)

NY . . . "EMBLEM ON-25" (manufactured by Unitika Ltd., nylon (NY) base material, thickness of 25 μm)

Comparative Examples 1 and 2

The same operation as in Example 2 was performed except that the resin particles (composite particles AE1) in the pretreatment liquid were changed to resin particles with the same mass listed in Table 1.

The results are listed in Table 1.

Comparative Example 3

The same operation as in Example 2 was performed except that the resin particles (composite particles AE1) in the pretreatment liquid were changed to water with the same mass (that is, the resin particles were not contained in the pretreatment liquid).

The results are listed in Table 1.

Comparative Example 4

The same operation as in Example 2 was performed except that the resin particles (acrylic resin particles IA-1) in the ink were changed to resin particles with the same mass listed in Table 1.

The results are listed in Table 1.

TABLE 1

| | Impermeable base material | | Ink set Pretreatment liquid | | | | | Ink Resin particles | | | | | Evaluation results | | |
|---|---|---|---|---|---|---|---|---|---|---|---|---|---|---|---|
| | | Surface tension (mN/m) | Aggregating agent | Resin particles | | | | | | | | | Adhesiveness | Rub resistance | Lamination strength |
| | Type | | | Type | E/A ratio | $T_{gp}$ (°C.) | $P_p$ (nm) | Type | Classification of resins | $T_{gi}$ (°C.) | $P_i$ (nm) | $T_{gi} - T_{gp}$ (°C.) | $P_p - P_i$ (nm) | | | |
| Example 1 | PET | 50 | None | AE1 (Composite particles) | 0.9 | 47 | 45 | IA-1 | Acryl | 120 | 10 | 73 | 35 | 5 | 4 | 4 |
| Example 2 | PET | 50 | Malonic acid | AE1 (Composite particles) | 0.9 | 47 | 45 | IA-1 | Acryl | 120 | 10 | 73 | 35 | 5 | 5 | 5 |
| Example 3 | PET | 50 | Malonic acid | AE2 (Composite particles) | 1.0 | 47 | 45 | IA-1 | Acryl | 120 | 10 | 73 | 35 | 5 | 5 | 5 |
| Example 4 | PET | 50 | CaCl$_2$ | AE1 (Composite particles) | 0.9 | 47 | 45 | IA-1 | Acryl | 120 | 10 | 73 | 35 | 4 | 5 | 5 |
| Example 5 | PET | 50 | PD-7 | AE1 (Composite particles) | 0.9 | 47 | 45 | IA-1 | Acryl | 120 | 10 | 73 | 35 | 4 | 5 | 5 |
| Example 6 | PET | 50 | TC-310 | AE1 (Composite particles) | 0.9 | 47 | 45 | IA-1 | Acryl | 120 | 10 | 73 | 35 | 4 | 5 | 5 |
| Example 7 | PET | 50 | Malonic acid | E1 and A1 (mixture) | 2.3 | 81 | 36 | IA-1 | Acryl | 120 | 10 | 40 | 26 | 4 | 5 | 4 |
| Example 8 | PET | 50 | Malonic acid | E1 and A1 (mixture) | 1.0 | 98 | 40 | IA-1 | Acryl | 120 | 10 | 23 | 30 | 3 | 5 | 4 |
| Example 9 | PET | 50 | Malonic acid | E1 and A1 (mixture) | 1.0 | 45 | 50 | IA-1 | Acryl | 120 | 10 | 76 | 40 | 4 | 5 | 5 |
| Example 10 | PET | 50 | Malonic acid | AE1 (Composite particles) | 0.9 | 47 | 45 | IU-1 | Urethane | 101 | 30 | 54 | 15 | 4 | 5 | 4 |
| Example 11 | PET | 50 | Malonic acid | AE1 (Composite particles) | 0.9 | 47 | 45 | IA-2 | Acryl | 101 | 138 | 54 | −93 | 4 | 4 | 5 |
| Example 12 | PET | 50 | Malonic acid | E1 and A1 (mixture) | 0.05 | 35 | 49 | IA-1 | Acryl | 120 | 10 | 85 | 39 | 3 | 5 | 3 |
| Example 13 | PET | 50 | Malonic acid | E1 and A1 (mixture) | 20 | 54 | 31 | IA-1 | Acryl | 120 | 10 | 66 | 21 | 4 | 3 | 3 |
| Example 14 | PET | 50 | Malonic acid | AE1 (Composite particles) | 0.9 | 47 | 45 | IA-3 | Acryl | −32 | 160 | −79 | −115 | 3 | 3 | 3 |
| Example 15 | OPP | 45 | Malonic acid | AE1 (Composite particles) | 0.9 | 47 | 45 | IA-1 | Acryl | 120 | 10 | 73 | 35 | 5 | 5 | 5 |
| Example 16 | NY | 55 | Malonic acid | AE1 (Composite particles) | 0.9 | 47 | 45 | IA-1 | Acryl | 120 | 10 | 73 | 35 | 5 | 5 | 5 |

TABLE 1-continued

| | Impermeable base material | | Pretreatment liquid | | | | | Ink | | | | | Evaluation results | | |
|---|---|---|---|---|---|---|---|---|---|---|---|---|---|---|---|
| | | Surface tension (mN/m) | Aggregating agent | Resin particles | | | | Resin particles | | | | | Adhesiveness | Rub resistance | Lamination strength |
| | Type | | | Type | E/A ratio | $T_{gp}$ (°C.) | $P_p$ (nm) | Type | Classification of resins | $T_{gi}$ (°C.) | $P_i$ (nm) | $T_{gi}-T_{gp}$ (°C.) | $P_p-P_i$ (nm) | | | |
| Comparative Example 1 | PET | 50 | Malonic acid | E1 | — | 55 | 30 | IA-1 | Acryl | 120 | 10 | 65 | 20 | 4 | 2 | 2 |
| Comparative Example 2 | PET | 50 | Malonic acid | A1 | 0 | 140 | 50 | IA-1 | Acryl | 120 | 10 | — | 40 | 2 | 4 | 2 |
| Comparative Example 3 | PET | 50 | Malonic acid | None | — | — | — | IA-1 | Acryl | 120 | 10 | — | — | 1 | 1 | 1 |
| Comparative Example 4 | PET | 50 | Malonic acid | AE1 (Composite particles) | 0.9 | 47 | 45 | IE-1 | Ester | 110 | 35 | 63 | 10 | 4 | 2 | 2 |

As listed in Table 1, in Examples 1 to 16 of using each ink set comprising the ink and the pretreatment liquid, in which the resin particles contained in the pretreatment liquid had at least one of the mixture of acrylic resin particles and polyester resin particles or composite particles including an acrylic resin and a polyester resin, the resin particles contained in the ink had at least one of acrylic resin particles or polyurethane resin particles, and the image was recorded on the impermeable base material with a surface energy of 40 mN/m or greater, the adhesiveness of the image and the rub resistance of the image were excellent.

Further, in Examples 1 to 16, the image recorded material and the base material for lamination had excellent lamination strength in the laminate which was laminated in disposition where the image and the base material for lamination were in contact with each other.

In Comparative Example 1 in which the resin particles contained in the pretreatment liquid were formed of only polyester resin particles, the rub resistance of the image was degraded as compared to the examples.

In Comparative Example 2 in which the resin particles contained in the pretreatment liquid were formed of only acrylic resin particles, the adhesiveness of the image was degraded.

In Comparative Example 3 in which the pretreatment liquid did not contain resin particles, the adhesiveness of the image and the rub resistance of the image were degraded.

In Comparative Example 4 in which the resin particles contained in the ink were polyester resin particles, the rub resistance of the image was degraded.

Based on the results of Examples 2 and 10, it was found that in a case where the resin particles contained in the ink included acrylic resin particles (Example 2), the adhesiveness of the image was further improved.

Based on the results of Examples 1, 2, and 4 to 6, it was found that the pretreatment liquid further contained at least one aggregating agent selected from the group consisting of a water-soluble cationic polymer, a polyvalent metal compound, an organic acid, and a metal complex (Examples 2 and 4 to 6), the rub resistance of the image was further improved.

Based on the results of Examples 9 and 12, it was found that in a case where the mass ratio (E/A ratio) of the polyester resin to the acrylic resin in the resin particles contained in the pretreatment liquid was 0.1 or greater (Example 9), the adhesiveness of the image was further improved.

Based on the results of Examples 9 and 13, it was found that in a case where the mass ratio (E/A ratio) of the polyester resin to the acrylic resin in the resin particles contained in the pretreatment liquid was 10 or less (Example 9), the rub resistance of the image was further improved.

Based on the results of Examples 11 and 14, it was found that in a case where the glass transition temperature $T_{gp}$ of the resin particles contained in the pretreatment liquid and the glass transition temperature $T_{gi}$ of the resin particles contained in the ink satisfied the relationship of $T_{gp}<T_{gi}$ (that is, "$0<T_{gi}-T_{gp}$") and more preferably relationships of 0° C.$<T_{gp}$, $<150°$ C., and 30° C.$<T_{gi}-T_{gp}$ (Example 11), the adhesiveness of the image and the rub resistance of the image were further improved.

Based on the results of Examples 2 and 11, it was found that in a case where the volume average particle diameter $P_p$ of the resin particles contained in the pretreatment liquid and the volume average particle diameter $P_i$ of the resin particles contained in the ink satisfied the relationship of $P_i<P_p$ (that is, the relationship of "$0<P_p-P_i$") (Example 2), the adhesiveness of the image and the rub resistance of the image were further improved.

Based on the results of Examples 3, 8, and 9, it was found that in a case where the resin particles contained in the pretreatment liquid included the composite particles containing an acrylic resin and a polyester resin (Example 3), the adhesiveness of the image was further improved.

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a multicolor image was recorded using the cyan ink and at least one ink other than the cyan ink.

The disclosure of Japanese Patent Application No. 2018-031942 filed on Feb. 26, 2018 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. An ink set which is used for recording an image on a surface having a surface energy of 40 mN/m or greater and included in an impermeable base material, the ink set comprising:
    an ink containing water, a colorant, and resin particles; and
    a pretreatment liquid containing water and resin particles,
    wherein the resin particles contained in the pretreatment liquid include at least one of a mixture of acrylic resin particles and polyester resin particles or composite particles including an acrylic resin and a polyester resin,
    the resin particles contained in the ink include at least one of acrylic resin particles or polyurethane resin particles, and
    in a case where a volume average particle diameter of the resin particles contained in the pretreatment liquid is set as $P_p$ and a volume average particle diameter of the resin particles contained in the ink is set as $P_i$, a relationship of $P_i<P_p$ is satisfied.

2. The ink set according to claim 1, wherein the resin particles contained in the ink include acrylic resin particles.

3. The ink set according to claim 1, wherein the pretreatment liquid further contains at least one aggregating agent selected from the group consisting of a polyvalent metal compound, an organic acid, a metal complex, and a water-soluble cationic polymer.

4. The ink set according to claim 1, wherein a mass ratio of the polyester resin to the acrylic resin in the resin particles contained in the pretreatment liquid is in a range of 0.1 to 10.

5. The ink set according to claim 1, wherein in a case where a glass transition temperature of the resin particles contained in the pretreatment liquid is set as $T_{gp}$ and a glass transition temperature of the resin particles contained in the ink is set as $T_{gi}$, a relationship of $T_{gp}<T_{gi}$ is satisfied.

6. The ink set according to claim 5, wherein relationships of $0°C.\leq T_{gp}$, $T_{gi}\leq 150°C.$, and $30°C.\leq T_{gi}-T_{gp}$ are satisfied.

7. The ink set according to claim 1, wherein the resin particles contained in the pretreatment liquid include the composite particles.

8. The ink set according to claim 1, wherein the ink set is used for recording of an image in a laminate comprising an image recorded material which includes the impermeable base material and the image recorded on the surface of the impermeable base material, and a base material for lamination which is laminated on a side where the image of the image recorded material is recorded.

9. An image recording method using the ink set according to claim 1, the method comprising:
    a step of applying the pretreatment liquid onto the surface of the impermeable base material; and
    a step of applying the ink to at least a part of a region where the pretreatment liquid has been applied onto the surface of the impermeable base material.

10. A method of producing a laminate, comprising:
    a step of obtaining an image recorded material which includes the impermeable base material and the image recorded on the surface of the impermeable base material by the image recording method according to claim 9; and
    a step of laminating a base material for lamination on a side where the image of the image recorded material is recorded to obtain a laminate.

* * * * *